US006366880B1

(12) United States Patent
Ashley

(10) Patent No.: US 6,366,880 B1
(45) Date of Patent: Apr. 2, 2002

(54) METHOD AND APPARATUS FOR SUPPRESSING ACOUSTIC BACKGROUND NOISE IN A COMMUNICATION SYSTEM BY EQUALIZTION OF PRE-AND POST-COMB-FILTERED SUBBAND SPECTRAL ENERGIES

(75) Inventor: James Patrick Ashley, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/451,074

(22) Filed: Nov. 30, 1999

(51) Int. Cl.[7] ......................... G10L 21/02; H04B 15/00; H04M 9/08

(52) U.S. Cl. ................... 704/226; 379/392.01; 455/570

(58) Field of Search ................................ 704/207, 226, 704/270; 379/392.01; 455/570

(56) References Cited

U.S. PATENT DOCUMENTS

| | | | | | |
|---|---|---|---|---|---|
| 4,571,613 | A | * | 2/1986 | Fukuda | 348/622 |
| 5,311,547 | A | * | 5/1994 | Wei | 375/290 |
| 5,355,431 | A | * | 10/1994 | Kane et al. | 704/226 |
| 5,524,148 | A | * | 6/1996 | Allen et al. | 379/391 |
| 5,553,134 | A | * | 9/1996 | Allen et al. | 379/387 |
| 5,617,505 | A | * | 4/1997 | Kane et al. | 704/210 |
| 5,621,850 | A | * | 4/1997 | Kane et al. | 704/206 |
| 5,630,015 | A | * | 5/1997 | Kane et al. | 704/226 |
| 6,098,038 | A | * | 8/2000 | Hermansky et al. | 704/226 |

OTHER PUBLICATIONS

"Digital Cellular Telecommunications System (Phase2+); Adaptive Multi–Rate (AMR) Speech Transcoding", GSM 06.90, Version 7.1.0, Release 1998.

"Discrete–Time Processing of Speech Signals" John R. Deller Jr., John G. Proakis and John H.L. Hansen, Macmillian Publishing Company, Published 1993.

Yanagisawa, K; Tanaka, K; Yamaura, I: "Detection of the Fundamental Frequency in Noisy Environment for Speech Enhancement of a Hearing Aid"; Control Applications, 1999. pp. 1330–1335 vol. 2, Aug., 22–27 1999; vol: 2.

* cited by examiner

*Primary Examiner*—Tālivaldis Ivars Šmits
(74) *Attorney, Agent, or Firm*—Sayed Hossain Beladi; Lalita P. Williams

(57) ABSTRACT

A noise suppression system implemented in communication system provides an improved level of quality during severe signal-to-noise ratio (SNR) conditions. The noise suppression system, inter alia, incorporates a frequency domain comb-filtering (289) technique which supplements a traditional spectral noise suppression method. The invention includes a real cepstrum generator (285) for an input signal (285) G(k) to produce a likely voiced speech pitch lag component and converting a result to frequency domain to obtain a comb-filter function (290) C(k), applying input signal (291) G(k) to comb-filter function (290) C(k), and equalizing the energies of the corresponding pre and post filtered subbands, to produce a signal (293) G"(k) to be used for noise suppression. This prevents high frequency components from being unnecessarily attenuated, thereby reducing muffling effects of prior art comb-filters.

14 Claims, 9 Drawing Sheets

METHOD AND APPARATUS FOR SUPPRESSING ACOUSTIC BACKGROUND NOISE IN A COMMUNICATION SYSTEM BY EQUALIZTION OF PRE-AND POST-COMB-FILTERED SUBBAND SPECTRAL ENERGIES

FIELD OF THE INVENTION

The present invention relates generally to noise suppression and, more particularly, to noise suppression in a communication system.

BACKGROUND OF THE INVENTION

Noise suppression techniques in communication systems are well known. The goal of a noise suppression system is to reduce the amount of background noise during speech coding so that the overall quality of the coded speech signal of the user is improved. Communication systems which implement speech coding include, but are not limited to, voice mail systems, cellular radiotelephone systems, trunked communication systems, airline communication systems, etc.

One noise suppression technique which has been implemented in cellular radiotelephone systems is spectral subtraction. In this approach, the audio input is divided into individual spectral bands (channel) by a suitable spectral divider and the individual spectral channels are then attenuated according to the noise energy content of each channel. The spectral subtraction approach utilizes an estimate of the background noise power spectral density to generate a signal-to-noise ratio (SNR) of the speech in each channel, which in turn is used to compute a gain factor for each individual channel. The gain factor is then used as an input to modify the channel gain for each of the individual spectral channels. The channels are then recombined to produce the noise-suppressed output waveform.

The U.S. Pat. No. 5,659,622, to Ashley, both assigned to the assignee of the present application, both incorporated by reference herein, each disclose a method and apparatus for suppressing acoustic background noise in a communication system. The use of wireless telephony is becoming widespread in acoustically harsh environments such as airports and train stations, as well as in-vehicle hands-free applications.

Therefore, a need exists for a robust noise suppression system for use in communication systems that provide high quality acoustic noise suppression.

DETAILED DESCRIPTION OF A PREFERRED EMBODIMENT

A noise suppression system implemented in a communication system provides an improved level of quality during severe signal-to-noise ratio (SNR) conditions. The noise suppression system, inter alia, incorporates a frequency domain comb-filtering technique which supplements a traditional spectral noise suppression method. The comb-filtering operation suppresses noise between voiced speech harmonics, and overcomes frequency dependent energy considerations by equalizing the pre and post comb-filtered spectra on a per frequency basis. This prevents high frequency components from being unnecessarily attenuated, thereby reducing muffling effects of prior art comb-filters.

Figure 1:
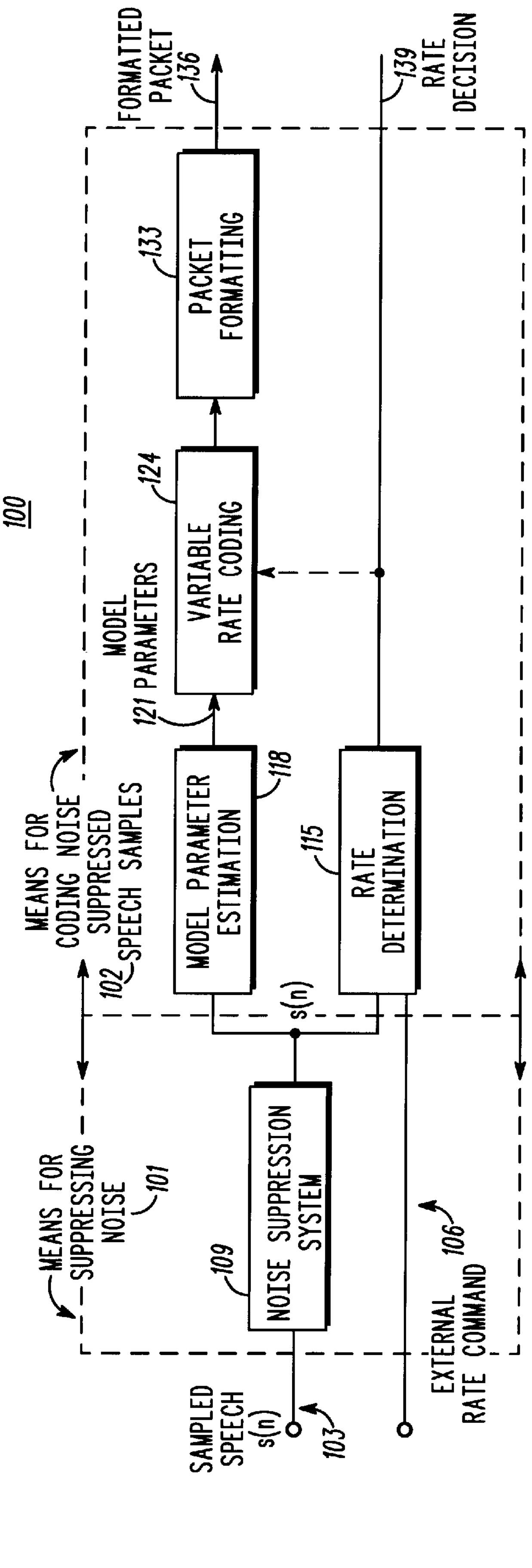
FIG. 1 generally depicts a block diagram of a speech coder for use in a communication system.

FIG. 1 generally depicts a block diagram of a speech coder 100 for use in a communication system. In the preferred embodiment, the speech coder 100 is a variable rate speech coder 100 suitable for suppressing noise in a code division multiple access (CDMA) communication system compatible with Interim Standard (IS) 95. For more information on IS-95, see TIA/EIA/IS-95, *Mobile Station-Base Station Compatibility Standard for Dual Mode Wideband Spread Spectrum Cellular System,* July 1993, incorporated herein by reference. Also in the preferred embodiment, the variable rate speech coder 100 supports three of the four bit rates permitted by IS-95: full-rate ("rate 1"—170 bits/frame), ½ rate ("rate ½"—80 bits/frame), and ⅛ rate ("rate ⅛"—16 bits/frame). As one of ordinary skill in the art will appreciate, the embodiment described hereinafter is for example only; the speech coder 100 is compatible with many different types communication systems.

Referring to FIG. 1, the means for coding noise suppressed speech samples 102 is based on the Residual Code-Excited Linear Prediction (RCELP) algorithm which is well known in the art. For more information on the RCELP algorithm, see W. B. Kleijn, P. Kroon, and D. Nahumi, "The RCELP Speech-Coding Algorithm", European Transactions on Telecommunications, Vol. 5, Number 5. September/October 1994, pp. 573–582. For more information on a RCELP algorithm appropriately modified for variable rate operation and for robustness in a CDMA environment, see D. Nahumi and W. B. Kleijn, "An Improved 8 kb/s RCELP coder", Proc. ICASSP 1995. RCELP is a generalization of the Code-Excited Linear Prediction (CELP) algorithm. For more information on the CELP algorithm, see B. S. Atal and M. R. Schroeder, "Stochastic coding of speech at very low bit rates", Proc Int. Conf. Comm., Amsterdam, 1984, pp. 1610–1613. Each of the above references is incorporated herein by reference.

Referring to FIG. 1, inputs to the speech coder 100 are a speech signal vector, s(n) 103, and an external rate command signal 106. The speech signal vector 103 may be created from an analog input by sampling at a rate of 8000 samples/sec, and linearly (uniformly) quantizing the resulting speech samples with at least 13 bits of dynamic range. Alternatively, the speech signal vector 103 may be created from 8-bit $\mu$law input by converting to a uniform pulse code modulated (PCM) format according to Table 2 in ITU-T Recommendation G.711. The external rate command signal 106 may direct the coder to produce a blank packet or other than a rate 1 packet. If an external rate command signal 106 is received, that signal 106 supersedes the internal rate selection mechanism of the speech coder 100.

The input speech vector 103 is presented to means for suppressing noise 101, which in the preferred embodiment is the noise suppression system 109. The noise suppression system 109 performs noise suppression in accordance with the invention. A noise suppressed speech vector, s'(n) 112, is then presented to both a rate determination module 115 and a model parameter estimation module 118. The rate determination module 115 applies a voice activity detection (VAD) algorithm and rate selection logic to determine the type of packet (rate ⅛, ½ or 1) to generate. The model parameter estimation module 118 performs a linear predictive coding (LPC) analysis to produce the model parameters 121. The model parameters include a set of linear prediction coefficients (LPCs) and an optimal pitch delay (t). The model parameter estimation module 118 also converts the LPCs to line spectral pairs (LSPs) and calculates long and short-term prediction gains.

The model parameters 121 are input into a variable rate coding module 124 characterises the excitation signal and quantifies the model parameters 121 in a manner appropriate to the selected rate. The rate information is obtained from a rate decision signal 139 which is also input into the variable rate coding module 124. If rate ⅛ is selected, the variable rate coding module 124 will not attempt to characterise any periodicity in the speech residual, but will instead simply characterise its energy contour. For rates ½ and rate 1, the variable rate coding module 124 will apply the RCELP algorithm to match a time-warped version of the original user's speech signal residual. After coding, a packet formatting module 133 accepts all of the parameters calculated and/or quantized in the variable rate coding module 124, and formats a packet 136 appropriate to the selected rate. The formatted packet 136 is then presented to a multiplex sub-layer for further processing, as is the rate decision signal 139. For further details on the overall operation of the speech coder 100, see IS-127 document Enhanced Variable Rate Codec, Speech Service Option 3 for Wideband Spread Spectrum Digital Systems, Sep. 9, 1996, incorporated herein by reference. Other means for coding noise suppressed speech disclosed in publication Digital cellular telecommunications system (Phase 2+), Adaptive Multi-Rate (AMR) speech transcoding, (GSM 06.90 version 7.1.0 Release 1998), incorporated by reference herein.

Figure 2:
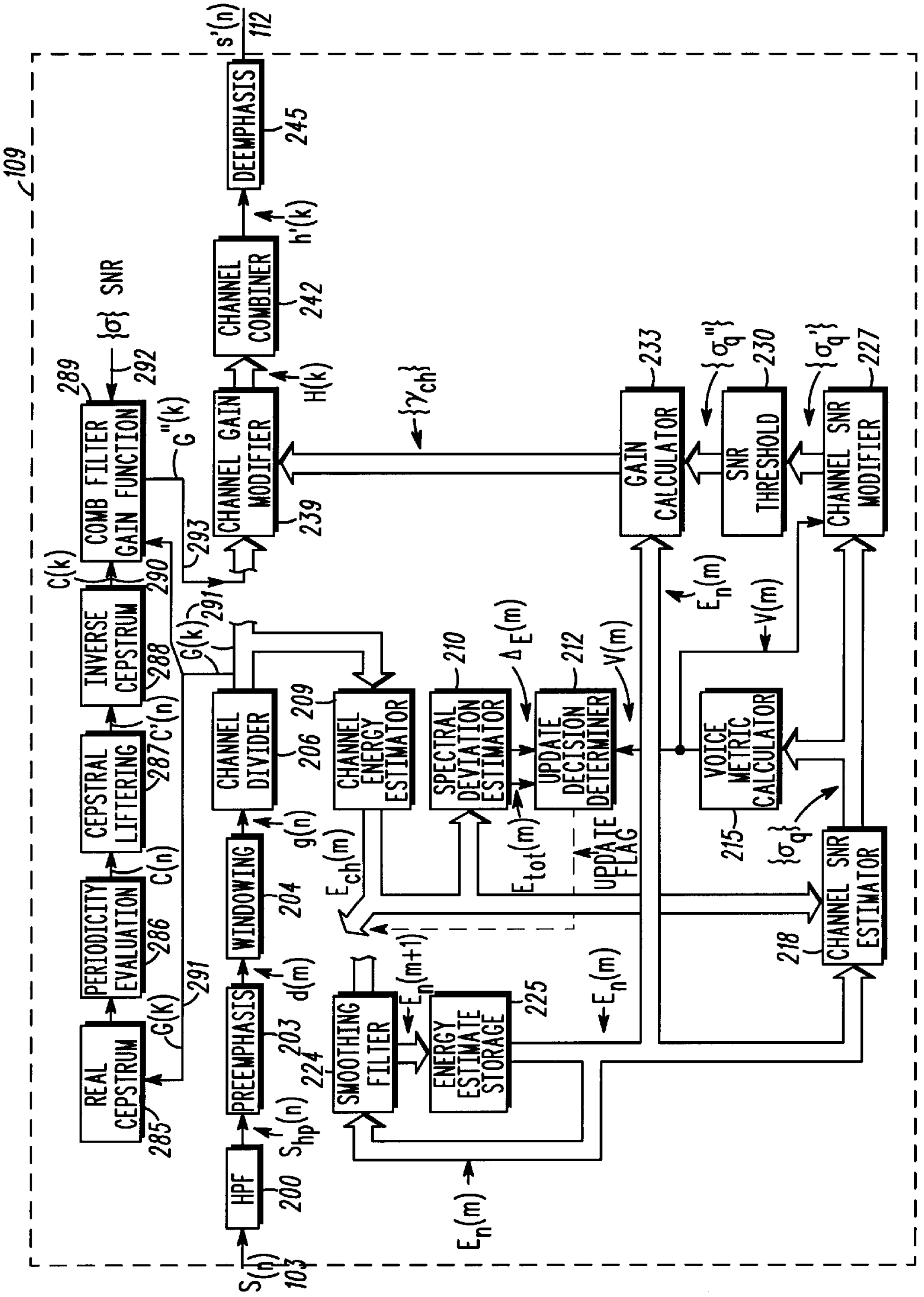
FIG. 2 generally depicts a block diagram of a noise suppression system in accordance with the invention.

FIG. 2 generally depicts a block diagram of an improved noise suppression system 109 in accordance with the invention. In the preferred embodiment, the noise suppression system 109 is used to improve the signal quality that is presented to the model parameter estimation module 118 and the rate determination module 115 of the speech coder 100. However, the operation of the noise suppression system 109 is generic in that it is capable of operating with any type of speech coder in a communication system.

The noise suppression system 109 input includes a high pass filter (HPF) 200. The output of the HPF 200 $s_{hp}(n)$ is used as input to the remaining noise suppresser circuitry of noise suppression system 109. The frame size of 10 ms and 20 ms are both possible, preferably, 20 msec. Consequently, in the preferred embodiment, the steps to perform noise suppression in accordance with the invention are executed one time per 20 ms speech frame, as opposed to two times per 20 ms speech frame for the prior art.

To begin noise suppression in accordance with the invention, the input signal s(n) is high pass filtered by high pass filter (HPF) 200 to produce the signal $s_{hp}(n)$. The HPF 200 may be a fourth order Chebyshev type II with a cutoff frequency of 120 Hz which is well known in the art. The transfer function of the HPF 200 is defined as:

$$H_{hp}(z) = \frac{\sum_{i=0}^{4} b(i)z^{-i}}{\sum_{i=0}^{4} a(i)z^{-i}},$$

where the respective numerator and denominator coefficients are defined to be:

b={0.898025036, −3.59010601, 5.38416243, −3.59010601, 0.898024917}, a={1.0, −3.78284979, 5.37379122, −3.39733505, 0.806448996}.

As one of ordinary skill in the art will appreciate, any number of high pass filter configurations may be employed.

Figure 3:
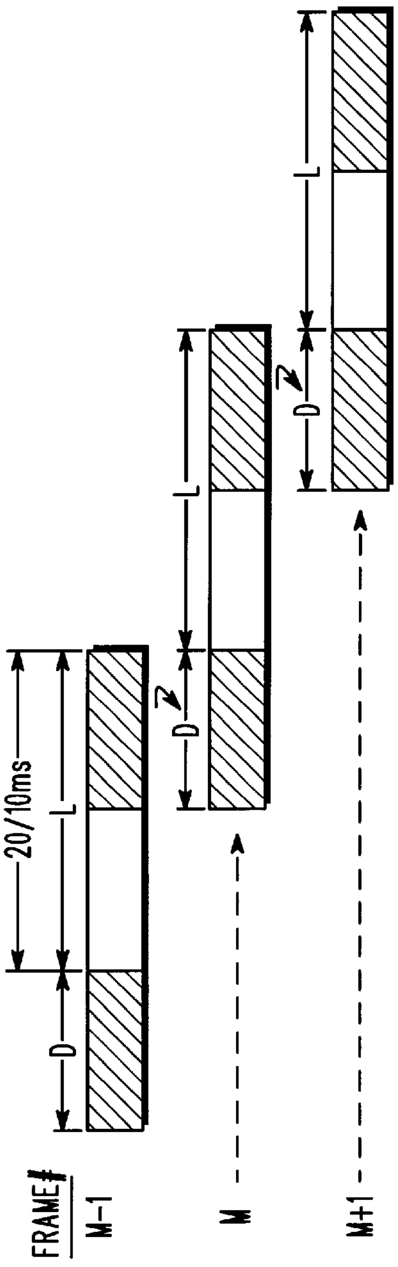
FIG. 3 generally depicts frame-to-frame overlap which occurs in the noise suppression system in accordance with the invention.

Next, in a preemphasis block 203, the signal $s_{hp}(n)$ is windowed using a smoothed trapezoid window, in which the first D samples d(m) of the input frame (frame "m") are overlapped from the last D samples of the previous frame (frame "m−1"). This overlap is best seen in FIG. 3. Unless otherwise noted, all variables have initial values of zero, e.g., d(m)=0; m≦0. This can be described as:

$$d(m,n)=d(m-1,L+n);\ 0\leqq n<D,$$

where m is the current frame, n is a sample index to the buffer {d(m)}, L=160 is the frame length, and D=40 is the overlap (or delay) in samples. The remaining samples of the input buffer are then preemphasized according to the following:

$$d(m,D+n)=s_{hp}(n)+\zeta_p s_{hp}(n-1);\ 0\leqq n<L,$$

where $\zeta_p$=−0.8 is the preemphasis factor. This results in the input buffer containing L+D=200 samples in which the first D samples are the preemphasized overlap from the previous frame, and the following L samples are input from the current frame.

Figure 4:
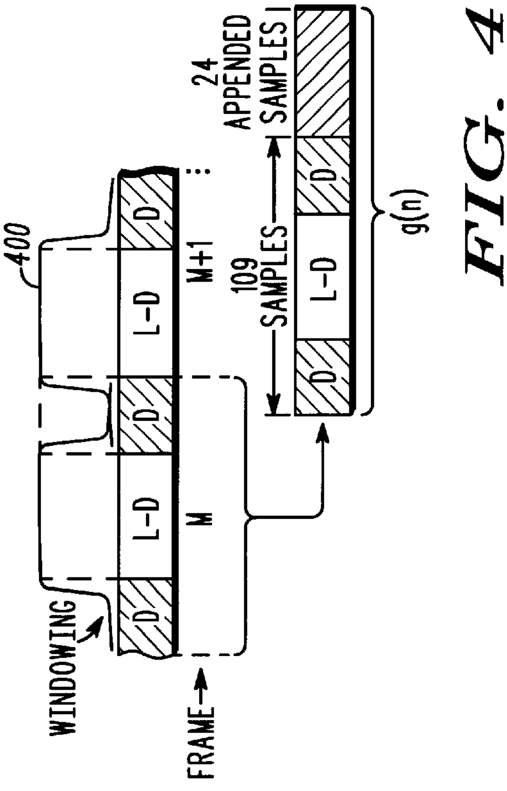
FIG. 4 generally depicts trapezoidal windowing of pre-emphasized samples which occurs in the noise suppression system in accordance with the invention.

Next, in a windowing block 204 of FIG. 2, a smoothed trapezoid window 400, shown in FIG. 4, is applied to the samples to form a Discrete Fourier Transform (DFT) input signal g(n). In the preferred embodiment, g(n) is defined as:

$$g(n) = \begin{cases} d(m, n)\sin^2(\pi(n+0.5)/2D); & 0 \le n < D, \\ d(m, n); & D \le n < L, \\ d(m, n)\sin^2(\pi(n-L+D+0.5)/2D); & L \le n < D+L, \\ 0; & D+L \le n < M, \end{cases}$$

where M=256 is the DFT sequence length and all other terms are previously defined.

In a channel divider 206 of FIG. 2, the transformation of g(n) to the frequency domain is performed using the Discrete Fourier Transform (DFT) defined as:

$$G(k) = \frac{2}{M}\sum_{n=0}^{M-1} g(n)e^{-j2\pi nk/M};\ 0 \le k < M,$$

where $e^{j\omega}$ is a unit amplitude complex phasor with instantaneous radial position ω. This is an atypical definition, but one that exploits the efficiencies of the complex Fast Fourier Transform (FFT). The 2/M scale factor results from conditioning the M point real sequence to form an M/2 point complex sequence that is transformed using an M/2 point complex FFT. In the preferred embodiment, the signal G(k) comprises 129 unique channels. Details on this technique can be found in Proakis and Manolakis, *Introduction to Digital Signal Processing,* 2nd Edition, New York, Macmillan, 1988, pp. 721–722.

The signal G(k) is then input to the channel energy estimator 209 where the channel energy estimate $E_{ch}(m)$ for the current frame, m, is determined using the following:

$$E_{ch}(m,i)=\max\left\{E_{\min},\ \alpha_{ch}(m)E_{ch}(m-1,i)+(1-\alpha_{ch}(m))\frac{1}{f_H(i)-f_L(i)+1}\sum_{k=f_L(i)}^{f_H(i)}|G(k)|^2\right\};\ 0\le i<N_c,$$

where $E_{min}$=0.0625 is the minimum allowable channel energy, $\alpha_{ch}(m)$ is the channel energy smoothing factor (defined below), $N_c$=16 is the number of combined channels, and $f_L(i)$ and $f_H(i)$ are the $i^{th}$ elements of the respective low and high channel combining tables, $f_L$ and $f_H$. In the preferred embodiment, $f_L$ and $F_H$ are defined as:

$$f_L=\{2, 6, 10, 14, 18, 22, 26, 32, 38, 44, 52, 60, 70, 82, 96, 110\},$$

$$f_H=\{5, 9, 13, 17, 21, 25, 31, 37, 43, 51, 59, 69, 81, 95, 109, 127\}.$$

The channel energy smoothing factor, $\alpha_{ch}(m)$, can be defined as:

$$\alpha_{ch}(m)=\begin{cases}0, & m\le 1\\ 0.19, & m>1\end{cases}$$

which means that $\alpha_{ch}(m)$ assumes a value of zero for the first frame (m=1) and a value of 0.19 for all subsequent frames. This allows the channel energy estimate to be initialized to the unfiltered channel energy of the first frame. In addition, the channel noise energy estimate (as defined below) should be initialized to the channel energy of the first four frames, i.e.:

$$E_n(m,i)=\max\{E_{init}, E_{ch}(m,i)\},\ m\leqq 4,\ 0\leqq i<N_c,$$

where $E_{init}$=16 is the minimum allowable channel noise initialization energy.

The channel energy estimate $E_{ch}(m)$ for the current frame is next used to estimate the quantized channel signal-to-noise ratio (SNR) indices. This estimate is performed in the channel SNR estimator 218 of FIG. 2, and is determined as:

$$\sigma(i)=10\log_{10}\left(\frac{E_{ch}(m,i)}{E_n(m,i)}\right),\quad 0\le i<N_c$$

and then $$\sigma_q(i)=\max\{0,\min\{89,\mathrm{round}\{\sigma(i)/0.375\}\}\},\ 0\leqq i<N_c$$

where $E_n(m)$ is the current channel noise energy estimate (as defined later), and the values of $\{\sigma_q\}$ are constrained to be between 0 and 89, inclusive.

Using the channel SNR estimate $\{\sigma_q\}$, the sum of the voice metrics is determined in the voice metric calculator 215 using:

$$v(m)=\sum_{i=0}^{N_c-1}V(\sigma_q(i))$$

where V(k) is the $k^{th}$ value of the 90 element voice metric table V, which is defined as:

i V={2, 2, 2, 2, 2, 2, 2, 2, 2, 2, 2, 3, 3, 3, 3, 3, 4, 4, 4, 5, 5, 5, 6, 6, 7, 7, 7, 8, 8, 9, 9, 10, 10, 11, 12, 12, 13, 13, 14, 15, 15, 16, 17, 17, 18, 19, 20, 20, 21, 22, 23, 24, 24, 25, 26, 27, 28, 28, 29, 30, 31, 32, 33, 34, 35, 36, 37, 37, 38, 39, 40, 41, 42, 43, 44, 45, 46, 47, 48, 49, 50, 50, 50, 50, 50, 50, 50, 50, 50, 50}.

Figure 5:
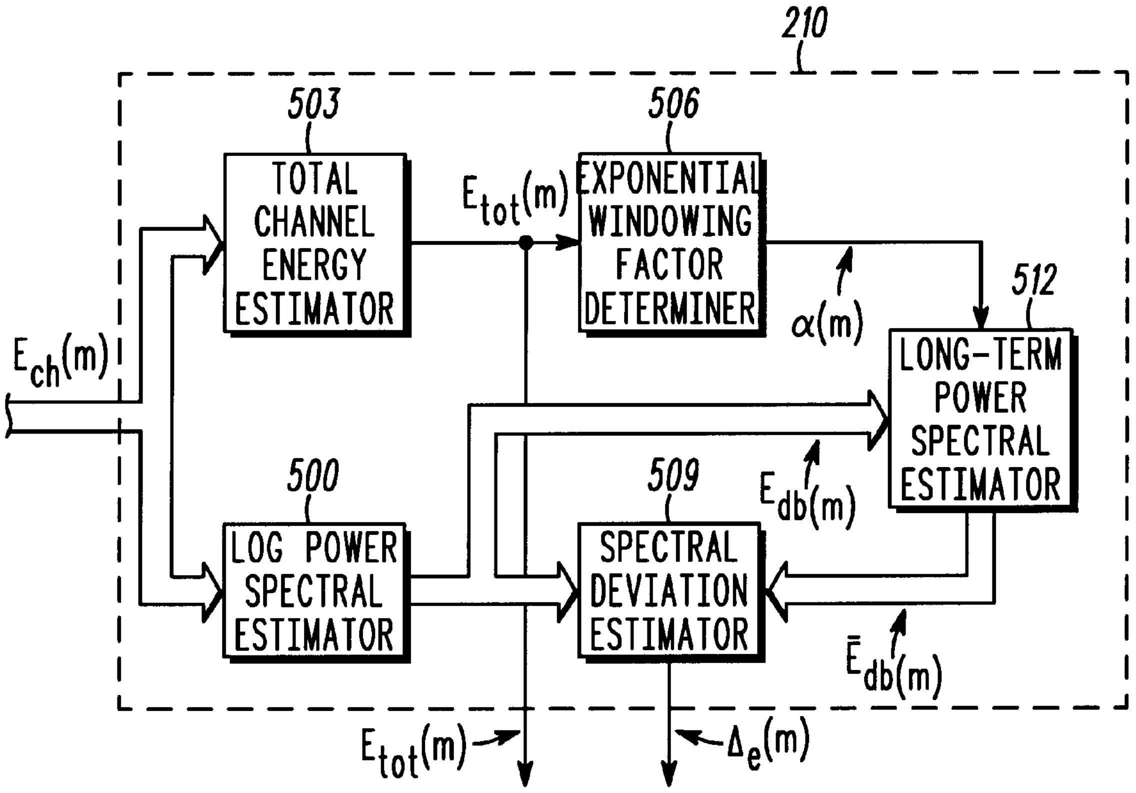
FIG. 5 generally depicts a block diagram of the spectral deviation estimator depicted in FIG. 2 and used in the noise suppression system in accordance with the invention.

The channel energy estimate $E_{ch}(m)$ for the current frame is also used as input to the spectral deviation estimator 210, which estimates the spectral deviation $\Delta_E(m)$. With reference to FIG. 5, the channel energy estimate $E_{ch}(m)$ is input into a log power spectral estimator 500, where the log power spectra is estimated as:

$$E_{dB}(m,i)=10\log_{10}(E_{ch}(m,i));\ 0\leqq i<N_c.$$

The channel energy estimate $E_{ch}(m)$ for the current frame is also input into a total channel energy estimator 503, to determine the total channel energy estimate, $E_{tot}(m)$, for the current frame, m, according to the following:

$$E_{tot}(m)=10\log_{10}\left(\sum_{i=0}^{N_c-1}E_{ch}(m,i)\right).$$

Next, an exponential windowing factor, α(m) (as a function of total channel energy $E_{tot}(m)$) is determined in the exponential windowing factor determiner 506 using:

$$\alpha(m)=\alpha_H-\left(\frac{\alpha_H-\alpha_L}{E_H-E_L}\right)(E_H-E_{tot}(m)),$$

which is limited between $\alpha_H$ and $\alpha_L$ by:

$$\alpha(m)=\max\{\alpha_L, \min\{\alpha_H, \alpha(m)\}\},$$

where $E_H$ and $E_L$ are the energy endpoints (in decibels, or "dB") for the linear interpolation of $E_{tot}(m)$, that is transformed to α(m) which has the limits $\alpha_L\leqq\alpha(m)\leqq\alpha_H$. The values of these constants are defined as: $E_H$=50, $E_L$=30, $\alpha_H$=0.98, $\alpha_L$=0.25. Given this, a signal with relative energy of, say, 40 dB would use an exponential windowing factor of α(m)=0.615 using the above calculation.

The spectral deviation $\Delta_E(m)$ is then estimated in the spectral deviation estimator 509. The spectral deviation $\Delta_E(m)$ is the difference between the current power spectrum and an averaged long-term power spectral estimate:

$$\Delta_E(m)=\sum_{i=0}^{N_c-1}|E_{dB}(m,i)-\bar{E}_{dB}(m,i)|,$$

where $\bar{E}_{dB}(m)$ is the averaged long-term power spectral estimate, which is determined in the long-term spectral energy estimator 512 using:

$$\bar{E}_{dB}(m+1,i)=\alpha(m)\bar{E}_{dB}(m,i)+(1-\alpha(m))E_{dB}(m,i)\ 0\leqq i<N_c,$$

where all the variables are previously defined. The initial value of $\bar{E}_{dB}(m)$ is defined to be the estimated log power spectra of frame 1, or:

$$\bar{E}_{dB}(m)=E_{dB}(m);m=1.$$

At this point, the sum of the voice metrics v(m), the total channel energy estimate for the current frame $E_{tot}(m)$ and the spectral deviation $\Delta_E(m)$ are input into the update decision determiner 212 to facilitate noise suppression. The decision logic, shown below in pseudo-code and depicted in flow diagram form in FIG. 6, demonstrates how the noise estimate update decision is ultimately made. The process starts at step 600 and proceeds to step 603, where the update flag ($update_{13}$ flag) is cleared. Then, at step 604, the update logic (VMSUM only) of Vilmur is implemented by checking whether the sum of the voice metrics v(m) is less than an update threshold ($UPDATE_{13}$ THLD). If the sum of the voice metric is less than the update threshold, the update counter (update_cnt) is cleared at step 605, and the update flag is set at step 606. The pseudo-code for steps 603–606 is shown below:

```
update_flag = FALSE;
if (v(m) ≦ UPDATE_THLD) {
    update_flag = TRUE
    update_cnt = 0
}
```

If the sum of the voice metric is greater than the update threshold at step 604, noise suppression in accordance with the invention is implemented. First, at step 607, the total channel energy estimate, $E_{tot}(m)$, for the current frame, m, is compared with the noise floor in dB ($NOISE_{13}$ $FLOOR_{13}$ DB) while the spectral deviation $\Delta_E(m)$ is compared with the deviation threshold (DEV_THLD). If the total channel energy estimate is greater than the noise floor and the spectral deviation is less than the deviation threshold, the update counter is incremented at step 608. After the update counter has been incremented, a test is performed at step 609 to determine whether the update counter is greater than or equal to an update counter threshold (UPDATE_CNT_THLD). If the result of the test at step 609 is true, then the update flag is set at step 606. The pseudo-code for steps 607–609 and 606 is shown below:

```
else if (( E_tot(m) > NOISE_FLOOR_DB ) and ( Δ_E(m) <
DEV_THLD)) {
    update_cnt = update_cnt + 1
    if ( update_cnt ≧ UPDATE_CNT_THLD )
        update_flag = TRUE
}
```

Figure 6:
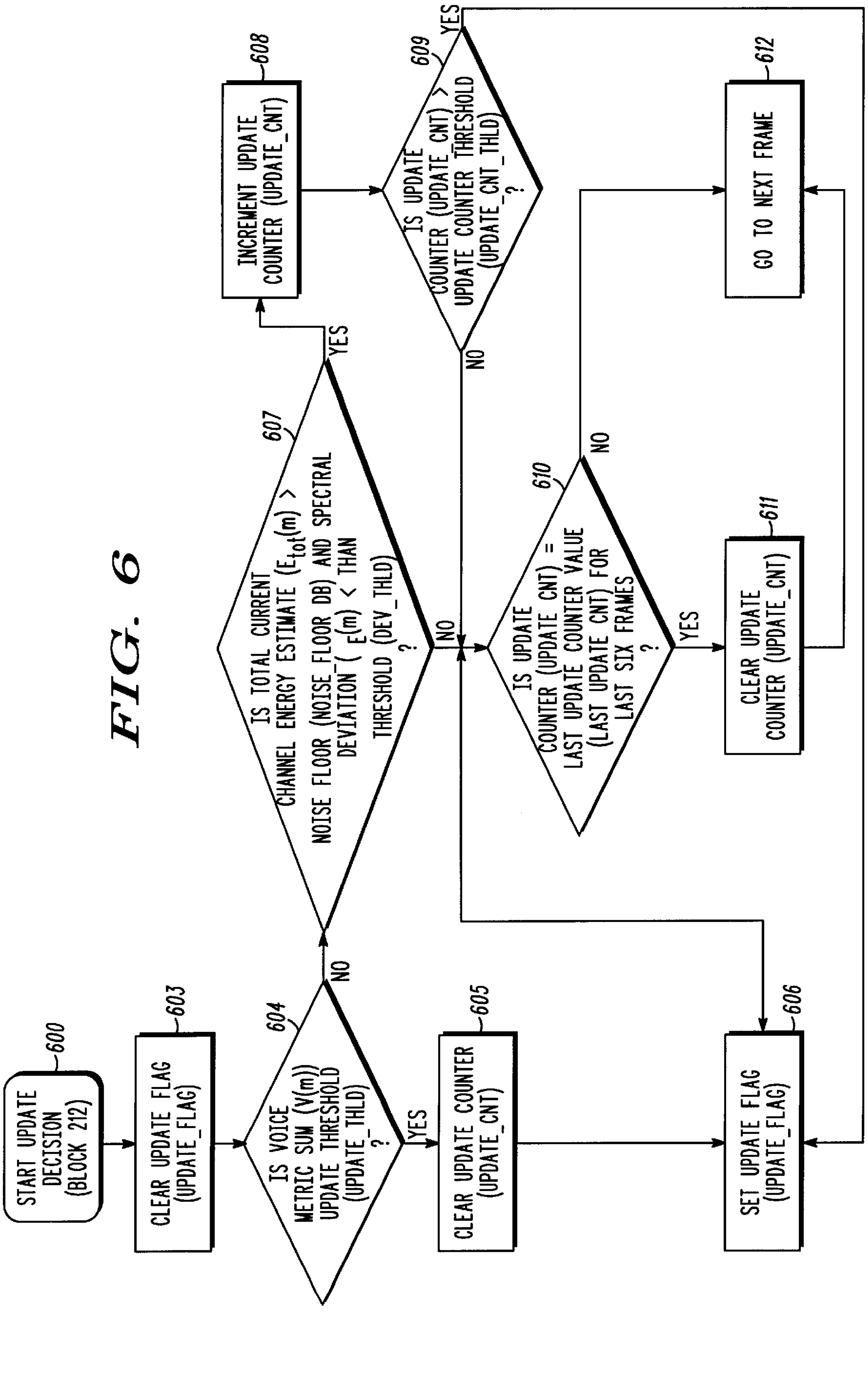
FIG. 6 generally depicts a flow diagram of the steps performed in the update decision determiner depicted in FIG. 2 and used in the noise suppression in accordance with the invention.

Referring to FIG. 6, if either of the tests at steps 607 and 609 are false, or after the update flag has been set at step 606, logic to prevent long-term "creeping" of the update counter is implemented. This hysteresis logic is implemented to prevent minimal spectral deviations from accumulating over long periods, and causing an invalid forced update. The process starts at step 610 where a test is performed to determine whether the update counter has been equal to the last update counter value (last_update_cnt) for the last six frames (HYSTER_CNT_THLD). In the preferred embodiment, six frames are used as a threshold, but any number of frames may be implemented. If the test at step 610 is true, the update counter is cleared at step 611, and the process exits to the next frame at step 612. If the test at step 610 is false, the process exits directly to the next frame at step 612. The pseudo-code for steps 610–612 is shown below:

```
if ( update_cnt = = last_update_cnt )
    hyster_cnt = hyster_cnt + 1
else
    hyster_cnt = 0
last_update_cnt = update_cnt
if ( hyster_cnt > HYSTER_CNT_THLD )
    update_cnt = 0.
```

In the preferred embodiment, the values of the previously used constants are as follows:

UPDATE_THLD=35,

NOISE_FLOOR_DB=$10\log_{10}(1)$,

DEV_THLD=32,

UPDATE_CNT_THLD=25, and

HYSTER_CNT_THLD=3.

Whenever the update flag at step 606 is set for a given frame, the channel noise estimate for the next frame is updated in accordance with the invention. The channel noise estimate is updated in the smoothing filter 224 using:

$$E_n(m+1,i)=\max\{E_{min},\alpha_n E_n(m,i)+(1-\alpha_n)E_{ch}(m,i)\};\ 0\leq i<N_c,$$

where $E_{min}$=0.0625 is the minimum allowable channel energy, and $\alpha_n$=0.81 is the channel noise smoothing factor stored locally in the smoothing filter 224. The updated channel noise estimate is stored in the energy estimate storage 225, and the output of the energy estimate storage 225 is the updated channel noise estimate $E_n(m)$. The updated channel noise estimate $E_n(m)$ is used as an input to the channel SNR estimator 218 as described above, and also the gain calculator 233 as will be described below.

Next, the noise suppression system 109 determines whether a channel SNR modification should take place. This determination is performed in the channel SNR modifier 227, which counts the number of channels which have channel SNR index values which exceed an index threshold. During the modification process itself, channel SNR modifier 227 reduces the SNR of those particular channels having an SNR index less than a setback threshold (SETBACK_THLD), or reduces the SNR of all of the channels if the sum of the voice metric is less than a metric threshold (METRIC_THLD). A pseudo-code representation of the channel SNR modification process occurring in the channel SNR modifier 227 is provided below:

```
    index_cnt = 0
for ( i = N_M to N_c − 1 step 1 ) {
    if (σ_q(i) ≧ INDEX_THLD )
        index_cnt = index_cnt + 1
}
if ( index_cnt < INDEX_CNT_THLD )
    modify_flag = TRUE
else
    modify_flag = FALSE
if ( modify_flag = = TRUE )
    for ( i = 0 to N_c − 1 step 1 )
        if (( v(m) ≦ METRIC_THLD ) or (σ_q(i) ≦
SETBACK_THLD ))
                σ'_q(i) = 1
        else
                σ'_q(i) = σ_q(i)
else
    {σ'_q} = {σ_q}
```

At this point, the channel SNR indices $\{\sigma_q\}$ are limited to a SNR threshold in the SNR threshold block 230. The constant $\sigma_{th}$ is stored locally in the SNR threshold block 230. A pseudo-code representation of the process performed in the SNR threshold block 230 is provided below:

```
for ( i = 0 to Nc - 1 step 1 )
    if (σ'q(i) < σth)
        σ"q(i) = σth
    else
        σ"q(i) = σ'q(i)
```

In the preferred embodiment, the previous constants and thresholds are given to be:

$N_M=5$,
INDEX_THLD=12,
INDEX_CNT_THLD=5,
METRIC_THLD=45,
SETBACK_THLD=12, and
$\sigma_{th}=6$.

At this point, the limited SNR indices $\{\sigma_q''\}$ are input into the gain calculator 233, where the channel gains are determined. First, the overall gain factor is determined using:

$$\gamma_n = \max\left\{\gamma_{\min}, -10\log_{10}\left(\frac{1}{E_{floor}}\sum_{i=0}^{N_c-1} E_n(m, i)\right)\right\},$$

where $\gamma_{min}=-13$ is the minimum overall gain, $E_{floor}=1$ is the noise floor energy, and $E_n(m)$ is the estimated noise spectrum calculated during the previous frame. In the preferred embodiment, the constants $\gamma_{min}$ and $E_{floor}$ are stored locally in the gain calculator 233. Continuing, channel gains (in dB) are then determined using:

$$\gamma_{dB}(i)=\mu_g(\sigma''_q(i)-\sigma_{th})+\gamma_n;\ 0\leqq i<N_c,$$

where $\mu g=0.39$ is the gain slope (also stored locally in gain calculator 233). The linear channel gains are then converted using:

$$\gamma_{ch}(i)=\min\{1,10^{\gamma_{dB}(i)/20}\},\ 0\leqq i<N_c$$

Next, the comb-filtering process is performed in accordance with the invention. First, the real cepstrum of signal 291 G(k) is generated in a real Cepstrum 285 by applying the inverse DFT to the log power spectrum. Details on the real cepstrum and related background material can be found in *Discrete-Time Processing of Speech Signals,* Macmillian, 1993, pp. 355–386.

$$c(n) = \sum_{k=0}^{M-1} \log(|G(k)|^2)e^{j2\pi nk/M}, \quad 0 \le n < M$$

Then, the likely voiced speech pitch lag component is found by periodicity evaluation 286 which evaluates the cepstrum for the largest magnitude within the allowable pitch lag range:

$$c_{max}=\max\{|c(n)|\},\ \tau_l\leqq n\leqq\tau_h$$

where $\tau=20$ and $\tau_h=100$ are the low and high limits of the expected pitch lag. All cepstral components are then zeroed-out ("liftered") in cepstral liftering 287, except those near the estimated pitch lag, as follows:

$$c'(n) = \begin{cases} c(n), & (n_{\max} - \Delta) \le n \le (n_{\max} + \Delta) \\ c(n), & (M - n_{\max} - \Delta) \le n \le (M - n_{\max} + \Delta) \\ 0, & \text{otherwise} \end{cases}$$

where $n_{max}$ is the index of c(n) corresponding to the value of $c_{max}$, and $\Delta=3$ is the pitch lag window offset. The un-scaled DFT is then applied to the liftered cepstrum in inverse cepstrum 288, thereby returning to the linear frequency domain, to obtain the comb-filter function 290 C(k):

$$C(k) = \sqrt{\exp\left(\sum_{n=0}^{M-1} c'(n)e^{-j2\pi nk/M}\right)}, \quad 0 \le k < M$$

The comb-filter gain coefficient is then calculated in comb filter gain function 289, which may be based on the current estimate of the peak SNR 292:

$$\gamma_c=0.6-0.1/3.0(SNR_p(m)-22)$$

which is then limited to the values $0\leqq\gamma_c\leqq0.6$. The peak SNR is defined as:

$$SNR_p(m) = \begin{cases} 0.9SNR_p(m-1)+0.1SNR, & SNR>SNR_p(m-1) \\ 0.998SNR_p(m-1)+0.002SNR, & 0.625SNR_p(m-1)<SNR\le SNR_p(m-1) \\ SNR_p(m-1), & \text{otherwise} \end{cases}$$

where $$SNR = 10\log_{10}\left(\frac{1}{N_c}\sum_{i=0}^{N_c-1} 10^{\sigma(i)/10}\right)$$

is the estimated SNR for the current frame. This particular function for determining $\gamma_c$ uses a coefficient of 0.6 for values of the peak SNR less than 22 dB, and then subtracts 0.1 from $\gamma_c$ for every 3 dB above 22 dB until an SNR of 40 dB. As one skilled in the art may appreciate, there are many other possible methods for determining $\gamma_c$.

The composite comb-filter function, based on $\gamma_c$ and C(k) 290, is then applied to G(k) 291 signal as follows:

$$G'(k)=(1+\gamma_c(C(k), -1))G(k),\ 0\leqq k<M$$

The energies of the respective frequency bands of the pre and post comb-filtered spectra are then equalized, to produce G"(k) 293, by the following expression:

$$G''(k) = \sqrt{\frac{E_b(i)}{E_b'(i)}}\,G'(k), \quad k_s(i) \le k \le k_e(i), \quad 0 \le i < N_b$$

where $$E_b(i) = \sum_{k=k_s(i)}^{k_e(i)} |G(k)|^2, \quad 0 \le i < N_b$$

and

-continued $$E'_b(i) = \sum_{k=k_s(i)}^{k_e(i)} |G'(k)|^2, \quad 0 \le i < N_b$$

In these expressions, $E_b(i)$ is the band energy of the ith band of the input spectrum G(k), $E'_b(i)$ is the band energy of the ith band of the post comb-filtered spectrum, $N_b=4$ is the number of the frequency bands, and $k_s(i)$ and $k_e(i)$ are the frequency band limits, which are defined in the preferred embodiment as:

$$k_s=\{2, M/16, M/8, M/4\}$$

$$k_e=\{M/16-1, M/8-1, M/4-1, M/2-1\}$$

and G"(k) 293 is the equalized comb-filtered spectrum.

At this point, the spectral channel gains determined above are applied in multiplier 290 to the equalized comb-filtered spectrum G"(k) 293 with the following criteria for input to channel gain modifier 290 to produce the output signal H(k) from the channel gain modifier 239:

$$H(k) = \begin{cases} \gamma_{ch}(i)G''(k), & f_L(i) \le k \le f_H(i), \quad 0 \le i < N_c \\ G''(k), & \text{otherwise} \end{cases}$$

The otherwise condition in the above equation assumes the interval of k to be $0 \leqq k \leqq M/2$. It is further assumed that H(k) is even symmetric (odd phase), so that the following condition is also imposed:

$$H(M-k)=H^*(k),\ 0<k<M/2$$

where * denotes the complex conjugate. The signal H(k) is then converted (back) to the time domain in the channel combiner 242 by using the inverse DFT:

$$h(m, n) = \frac{1}{2}\sum_{k=0}^{M-1} H(k)e^{j2\pi nk/M}; \quad 0 \le n < M,$$

and the frequency domain filtering process is completed to produce the output signal h'(n) by applying overlap-and-add with the following criteria:

$$h'(n) = \begin{cases} h(m, n) + h(m-1, n+L); & 0 \le n < M-L, \\ h(m, n); & M-L \le n < L, \end{cases}$$

Signal deemphasis is applied to the signal h'(n) by the deemphasis block 245 to produce the signal s'(n) having been noised suppressed in accordance with the invention:

$$s'(n)=h'(n)+\zeta_d s'(n-1);\ 0 \leqq n<L,$$

where $\zeta_d=0.8$ is a deemphasis factor stored locally within the deemphasis block 245, is a code division multiple access (CDMA) cellular radiotelephone system. As one of ordinary skill in the art will appreciate, however, the noise suppression system in accordance with the invention can be implemented in any communication system which would benefit from the system. Such systems include, but are not limited to, voice mail systems, cellular radiotelephone systems, trunked communication systems, airline communication systems, etc. Important to note is that the noise suppression system in accordance with the invention may be beneficially implemented in communication systems which do not include speech coding, for example analog cellular radiotelephone systems.

Figure 7:
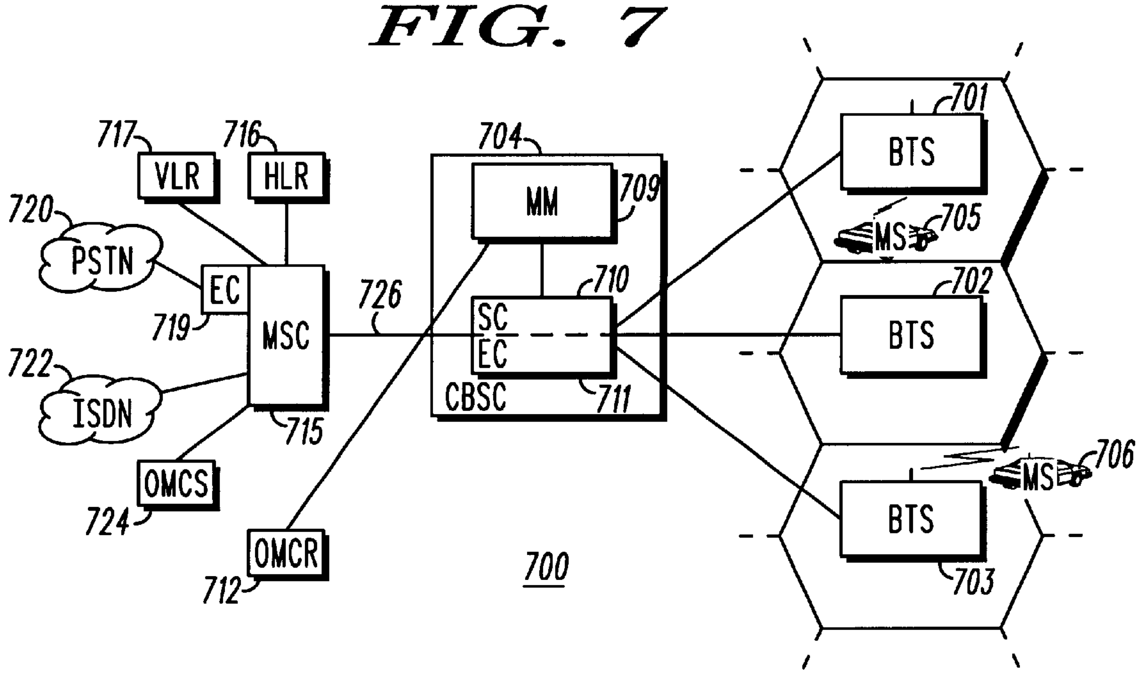
FIG. 7 generally depicts a block diagram of a communication system which may beneficially implement the noise suppression system in accordance with the invention.

Referring to FIG. 7, acronyms are used for convenience. The following is a list of definitions for the acronyms used in FIG. 7:

BTS Base Transceiver Station
CBSC Centralized Base Station Controller
EC Echo Canceller
VLR Visitor Location Register
HLR Home Location Register
ISDN Integrated Services Digital Network
MS Mobile Station
MSC Mobile Switching Center
MM Mobility Manager
OMCR Operations and Maintenance Center-Radio
OMCS Operations and Maintenance Center-Switch
PSTN Public Switched Telephone Network
TC Transcoder As seen in FIG. 7, a BTS 701–703 is coupled to a CBSC 704. Each BTS 701–703 provides radio frequency (RF) communication to an MS 705–706. In the preferred embodiment, the transmitter/receiver (transceiver) hardware implemented in the BTSs 701–703 and the MSs 705–706 to support the RF communication is defined in the document titled TIA/EIA/IS95, *Mobile Station-Base Station Compatibility Standard for Dual Mode Wideband Spread Spectrum Cellular System,* July 1993 available from the Telecommunication Industry Association (TIA). The CBSC 704 is responsible for, inter alia, call processing via the TC 710 and mobility management via the MM 709. In the preferred embodiment, the functionality of the speech coder 100 of FIG. 2 resides in the TC 704. Other tasks of the CBSC 704 include feature control and transmission/networking interfacing. For more information on the functionality of the CBSC 704, reference is made to U.S. patent application Ser. No. 07/997,997 to Bach et al., assigned to the assignee of the present application, and incorporated herein by reference.

Also depicted in FIG. 7 is an OMCR 712 coupled to the MM 709 of the CBSC 704. The OMCR 712 is responsible for the operations and general maintenance of the radio portion (CBSC 704 and BTS 701–703 combination) of the communication system 700. The CBSC 704 is coupled to an MSC 715 which provides switching capability between the PSTN 720/ISDN 722 and the CBSC 704. The OMCS 724 is responsible for the operations and general maintenance of the switching portion (MSC 715) of the communication system 700. The HLR 716 and VLR 717 provide the communication system 700 with user information primarily used for billing purposes. ECs 711 and 719 are implemented to improve the quality of speech signal transferred through the communication system 700.

The functionality of the CBSC 704, MSC 715, HLR 716 and VLR 717 is shown in FIG. 7 as distributed, however one of ordinary skill in the art will appreciate that the functionality could likewise be centralized into a single element. Also, for different configurations, the TC 710 could likewise be located at either the MSC 715 or a BTS 701–703. Since the functionality of the noise suppression system 109 is generic, the present invention contemplates performing noise suppression in accordance with the invention in one element (e.g., the MSC 715) while performing the speech coding function in a different element (e.g., the CBSC 704). In this embodiment, the noised suppressed signal s'(n) (or data representing the noise suppressed signal s'(n)) would be transferred from the MSC 715 to the CBSC 704 via the link 726.

In the preferred embodiment, the TC 710 performs noise suppression in accordance with the invention utilizing the noise suppression system 109 shown in FIG. 2. The link 726 coupling the MSC 715 with the CBSC 704 is a T1/E1 link which is well known in the art. By placing the TC 710 at the CBSC, a 4:1 improvement in link budget is realized due to compression of the input signal (input from the T1/E1 link 726) by the TC 710. The compressed signal is transferred to a particular BTS 701–703 for transmission to a particular MS 705–706. Important to note is that the compressed signal transferred to a particular BTS 701–703 undergoes further processing at the BTS 701–703 before transmission occurs. Put differently, the eventual signal transmitted to the MS 705–706 is different in form but the same in substance as the compressed signal exiting the TC 710. In either event the compressed signal exiting the TC 710 has undergone noise suppression in accordance with the invention using the noise suppression system 109 (as shown in FIG. 2).

When the MS 705–706 receives the signal transmitted by a BTS 701–703, the MS 705–706 will essentially "undo" (commonly referred to as "decode") all of the processing done at the BTS 701–703 and the speech coding done by the TC 710. When the MS 705–706 transmits a signal back to a BTS 701–703, the MS 705–706 likewise implements speech coding. Thus, the speech coder 100 of FIG. 1 resides at the MS 705–706 also, and as such, noise suppression in accordance with the invention is also performed by the MS 705–706. After a signal having undergone noise suppression is transmitted by the MS 705–706 (the MS also performs further processing of the signal to change the form, but not the substance, of the signal) to a BTS 701–703, the BTS 701–703 will "undo" the processing performed on the signal and transfer the resulting signal to the TC 710 for speech decoding. After speech decoding by the TC 710, the signal is transferred to an end user via the T1/E1 link 726. Since both the end user and the user in the MS 705–706 eventually receive a signal having undergone noise suppression in accordance with the invention, each user is capable of realizing the benefits provided by the noise suppression system 109 of the speech coder 100.

Figure 8:
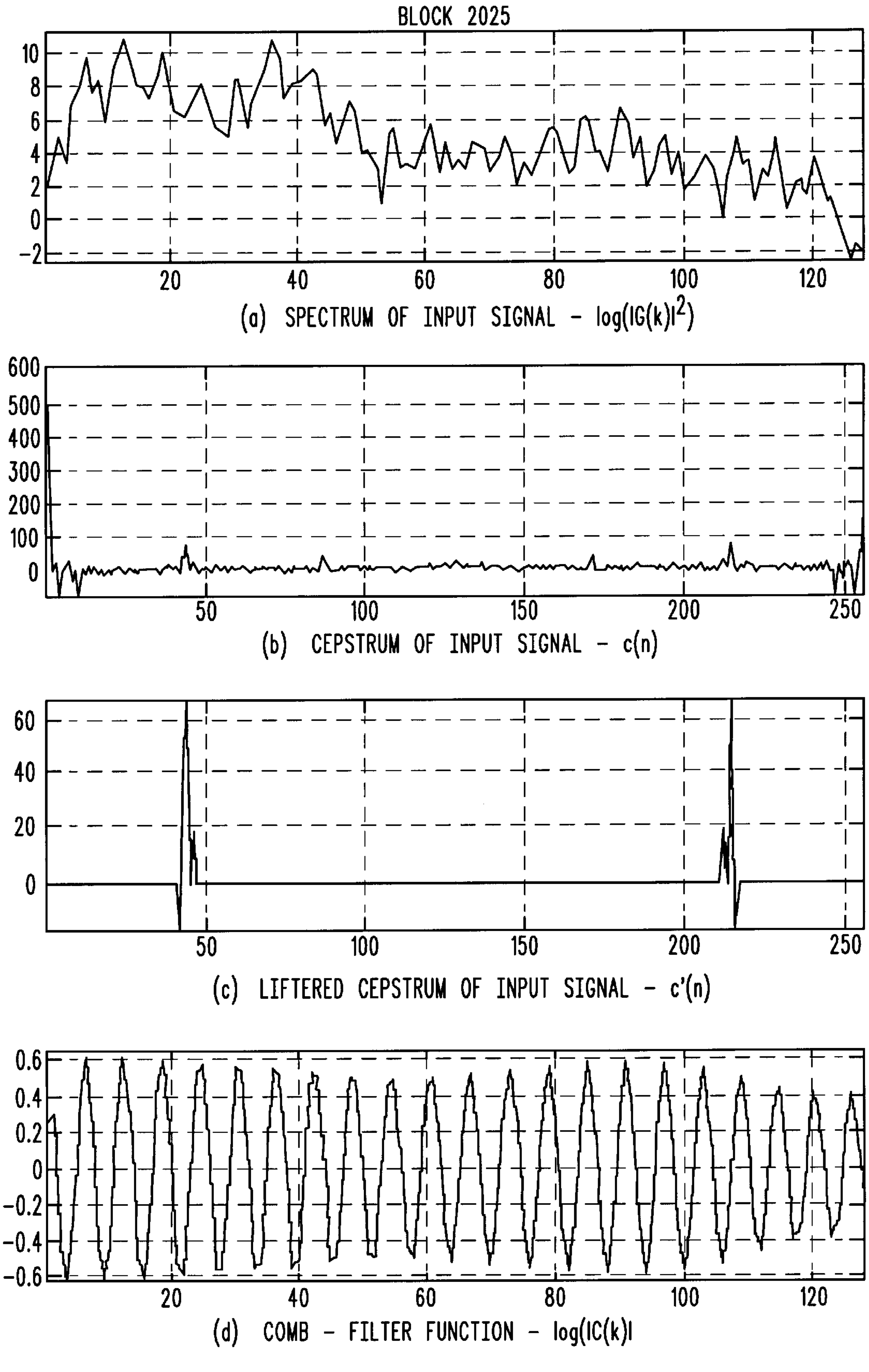
FIGS. 8 and 9 generally depicts variables related to noise suppression of a noisy speech signal as implemented by the noise suppression system in accordance with the invention.
Figure 9:
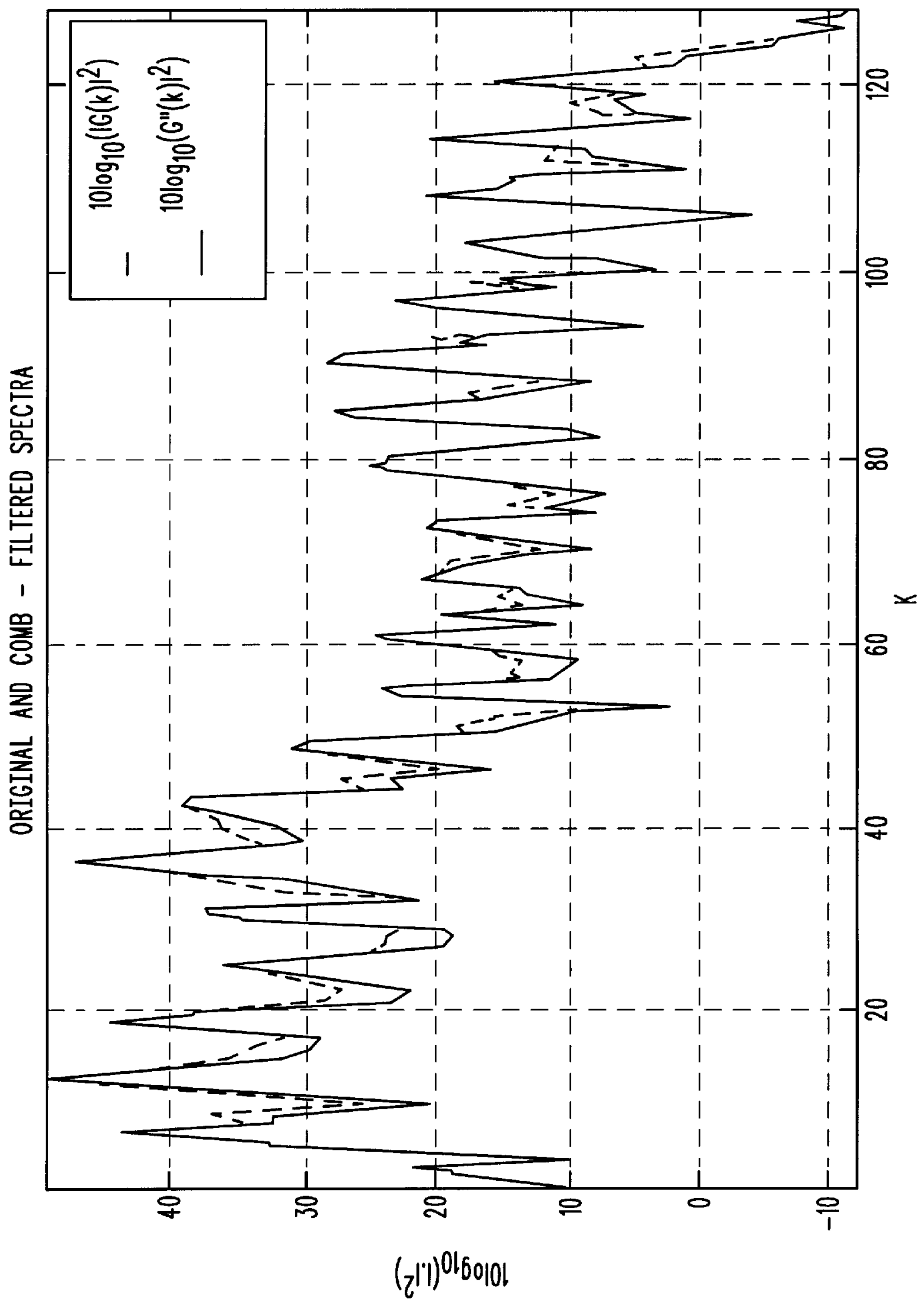
Figure 10A:
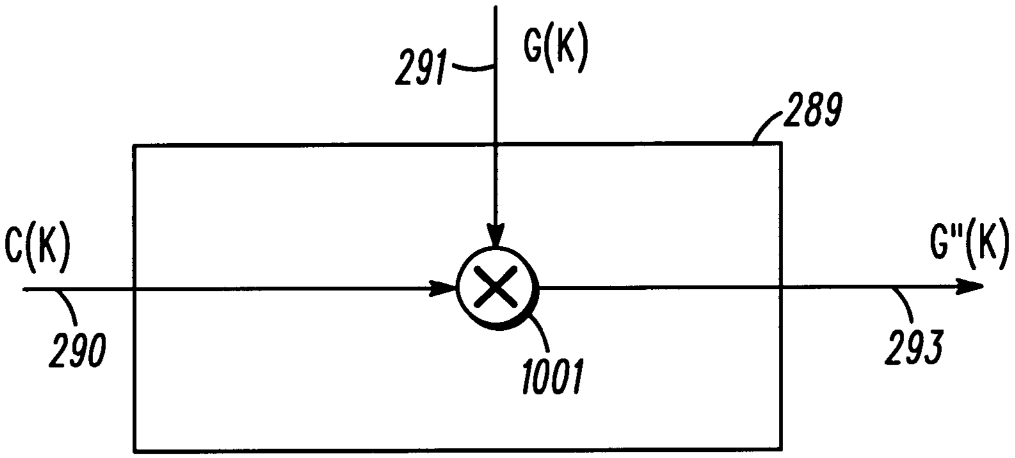
FIGS. 10A and 10B depict various implementations of a comb-filter gain function according to various aspects of the invention.
Figure 10B:
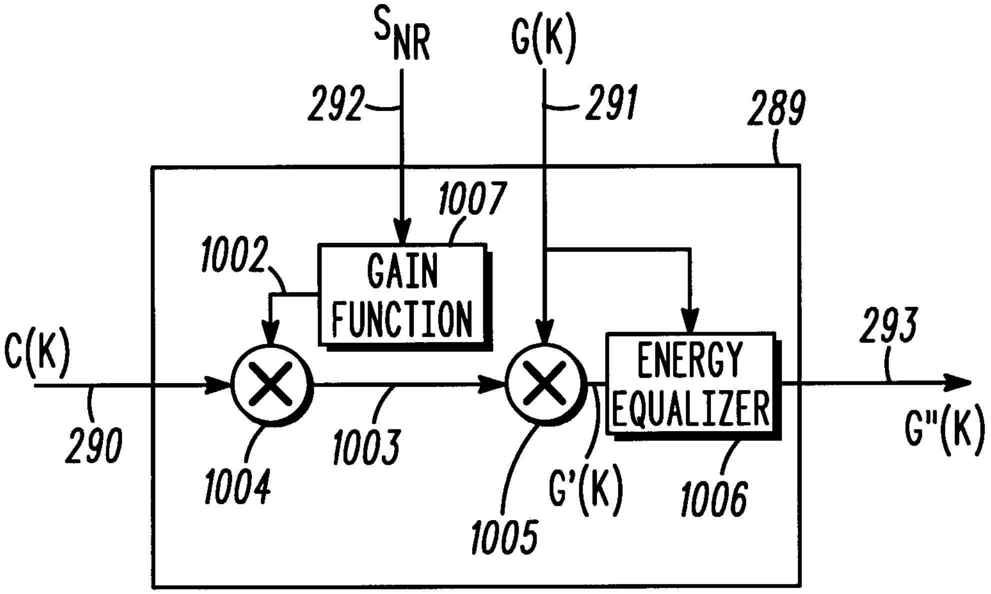

FIG. 8 and FIG. 9 generally depict variables related to noise suppression in accordance with the invention. The first plot labeled FIG. 8a shows the log domain power spectra of a voiced speech input signal corrupted by noise, represented as $\log(|G(k)|^2)$. The next plot FIG. 8*b* shows the corresponding real cepstrum c(n) and FIG. 8*c* shows the "liftered" cepstrum c'(n), wherein the estimated pitch lag has been determined. FIG. 8*d* then shows how the inverse liftered cepstrum $\log(|C(k)|^2)$ emphasizes the pitch harmonics in the frequency domain. Finally, FIG. 9 shows the original log power spectrum $\log(|G(k)|^2)$ superimposed with the equalized comb-filtered spectrum $\log(|G''(k)|^2)$. Here it can be clearly seen how the periodicity of the input signal is used to suppress noise between the frequency harmonics of the input frequency spectrum in accordance with the current invention. Various aspects of the invention may be more apparent by making references to FIGS. 10A and 10B showing various implementations of comb filter gain function 289. In FIG. 10A, the method and apparatus according to various aspects of the invention includes generating real cepstrum of an input signal 291 G(k), generating a likely voiced speech pitch lag component based a result of the generating real cepstrum, converting a result of the likely voiced speech pitch lag component to frequency domain to obtain a comb-filter function 290 C(k), and applying input signal 291 G(k) through a multiplier 1001 in comb filter gain function 289 to comb-filter function C(k) to produce a signal 293 G"(k) to be used for noise suppression of a speech signal 103.

Alternatively, referring to FIG. 10B, the step of applying input signal 291 G(k) to the comb-filter function 290 C(k) includes generating a comb-filter gain coefficient 1002 based on a signal-to-noise-ratio 292 through a gain function generator 1007, applying comb-filter gain coefficient 1002 through a multiplier 1004 to comb-filter function 290 C(k) to produce a composite comb-filter gain function 1003, applying input signal 291 G(k) to composite comb-filter gain function 1003 through multiplier 1005 to produce a signal G'(k), and equalizing energy in the signal G'(k) through energy equalizer 1006 to produce signal 293 G"(k) to be used for noise suppression of speech signal 103.

According to the invention, the likely voiced speech pitch lag component may have a largest magnitude within an allowable pitch rage. The converting step of the result of the likely voiced speech pitch lag component to frequency domain to obtain a comb-filter function 290 C(k) may include zeroing estimated pitch lags except pitch lags near the likely voiced speech pitch lag component. Various aspects of the invention may be implemented via software, hardware or a combination. Such methods are well known by one ordinarily skilled in the art.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. A method of suppressing acoustic background noise in a communication system comprising the steps of:

generating a frequency spectrum of an input signal;

determining a measure of the periodicity of the input signal;

determining a gain function from at least the measure of periodicity of the input signal;

applying the gain function to the frequency spectrum of the input signal; and equalizing the energy of a plurality of frequency bands of the corresponding pre and post filtered spectra.

2. The method in claim 1, wherein the method of determining a measure of the periodicity of the input signal further comprises the steps of:

calculating the cepstrum of the input signal;

evaluating the cepstrum for a pitch lag component.

3. The method in claim 1, wherein the step of determining a gain function from at least the measure of periodicity of the input signal further comprises the steps of:

generating a cepstrum based on the measure of periodicity of the input signal;

converting the cepstrum to the frequency domain to obtain a comb-filter function; and determining a gain function from at least the comb-filter function.

4. The method in claim 1, wherein the step of determining the gain function from at least the measure of periodicity of the input signal further comprises determining a gain function from an estimated signal-to-noise ratio and the measure of periodicity of the input signal.

5. A method of suppressing acoustic background noise in a communication system comprising the steps of:

generating a frequency spectrum of an input signal;

determining a gain function from at least a measure of periodicity of the input signal;

applying the gain function to the frequency spectrum of the input signal; and equalizing the energy of a plurality of frequency bands of the corresponding pre and post filtered spectra.

6. The method in claim 5, wherein the step of determining a gain function from at least a measure of periodicity of the input signal further comprises the steps of:

calculating the cepstrum of the input signal;

evaluating the cepstrum for a pitch lag component;

liftering the cepstrum with respect to the pitch lag component;

converting the liftered cepstrum to the frequency domain to obtain a comb-filter function; and determining a gain function from at least the comb-filter function.

7. The method in claim 5, wherein the step of determining the gain function from at least the measure of periodicity of the input signal further comprises determining a gain function from an estimated signal-to-noise ratio and a measure of periodicity of the input signal.

8. An apparatus for suppressing acoustic background noise in a communication system comprising:

means for generating a frequency spectrum of an input signal;

means for determining a measure of the periodicity of the input signal;

means for determining a gain function from at least the measure of periodicity of the input signal;

means for applying the gain function to the frequency spectrum of the input signal; and means for equalizing the energy of a plurality of frequency bands of the corresponding pre and post filtered spectra.

9. The apparatus as recited in claim 8, wherein said means for determining a measure of the periodicity of the input signal further comprises:

means for calculating the cepstrum of the input signal;

means for evaluating the cepstrum for a pitch lag component.

10. The apparatus in claim 8, wherein said means for determining a gain function from at least the measure of periodicity of the input signal further comprises:

means for generating a cepstrum based on the measure of periodicity of the input signal;

means for converting the cepstrum to the frequency domain to obtain a comb-filter function; and means for determining a gain function from at least the comb-filter function.

11. The apparatus in claim 8, wherein said means for determining the gain function from at least the measure of periodicity of the input signal further comprises means for determining a gain function from an estimated signal-to-noise ratio and a measure of periodicity of the input signal.

12. An apparatus for suppressing acoustic background noise in a communication system comprising:

means for generating a frequency spectrum of an input signal;

means for determining a gain function from at least a measure of periodicity of the input signal;

means for applying the gain function to the frequency spectrum of the input signal; and means for equalizing the energy of a plurality of frequency bands of the corresponding pre and post filtered spectra.

13. The apparatus as recited in claim 12, wherein said means for determining a gain function from at least a measure of periodicity of the input signal further comprises:

means for calculating the cepstrum of the input signal;

means for evaluating the cepstrum for a pitch lag component;

means for liftering the cepstrum with respect to the pitch lag component;

means for converting the liftered cepstrum to the frequency domain to obtain a comb-filter function; and means for determining a gain function from at least the comb-filter function.

14. The apparatus in claim 12, wherein said means for determining the gain function from at least the measure of periodicity of the input signal further comprises means for determining a gain function from an estimated signal-to-noise ratio and a measure of periodicity of the input signal.

* * * * *